United States Patent [19]
Mark et al.

[11] Patent Number: 5,189,488
[45] Date of Patent: Feb. 23, 1993

[54] FIBER OPTICAL GYROSCOPE UTILIZING ORTHOGONAL SEQUENCES

[75] Inventors: John G. Mark, Pasadena; George A. Pavlath, Thousand Oaks; Daniel A. Tazartes, West Hills, all of Calif.

[73] Assignee: Litton Systems, Inc., Beverly Hills, Calif.

[21] Appl. No.: 796,868

[22] Filed: Nov. 25, 1991

[51] Int. Cl.⁵ .............................. G01C 19/72
[52] U.S. Cl. ................................. 356/350
[58] Field of Search ................. 356/345, 350; 250/227.27

[56] References Cited
U.S. PATENT DOCUMENTS
4,591,269 5/1986 Mohr ........................ 356/350

Primary Examiner—Samuel A. Turner
Attorney, Agent, or Firm—Elliott N. Kramsky

[57] ABSTRACT

Single and multiple axis fiber optic gyroscope systems employ orthogonal sequences to minimize the effects of both intra and inter-axis crosstalk. Sequences for driving electro-optic modulators are derived by examination of underlying primary and secondary demodulation sequences. Such underlying sequences are examined for orthogonality in accordance with a number of selection rules. When the selection rules are satisfied, the corresponding modulation sequences for driving the gyro(s) are identified and applied. By selecting the modulation waveforms in accordance with orthogonality criteria, one is assured of mean-zero bias errors within a predetermined number of loop transit times.

24 Claims, 4 Drawing Sheets

FIBER OPTICAL GYROSCOPE UTILIZING ORTHOGONAL SEQUENCES

BACKGROUND

1. Field of the Invention

The present invention relates to apparatus and methods for imposing an artificial phase shift upon the counterpropagating beam pair of a Sagnac interferometer. More particularly, this invention pertains to the deterministic sequences for effecting such artificial phase shifts to avoid undesired crosstalk and thereby overcome bias errors.

2. Description of the Prior Art

The Sagnac interferometer is an instrument for determining rotation by measurement of the nonreciprocal phase difference generated between a pair of counterpropagating light beams. This instrument generally comprises a light source such as a laser, an optical waveguide consisting of several mirrors or a plurality of turns of optical fiber, a beamsplitter/combiner, a detector and a signal processor.

In an interferometer, the waves coming out of the beamsplitter counterpropagate along a single optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide whereas "nonreciprocal" perturbations affect the counterpropagating beams differently and according to the direction of propagation. Such nonreciprocal perturbations are occasioned by physical effects that disrupt the symmetry of the optical medium in which the two waves propagate.

Two of the nonreciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of a fiber gyroscope.

The measured or detected output of a gyroscope is a "combined" beam (i.e., a composite beam formed of the two counterpropagating beams after one complete traverse of the gyroscope loop.) The rotation rate about the sensitive axis is proportional to the phase shift that occurs between the counterpropagating beams. Accordingly, accurate phase shift measurement is essential.

Figure 1:
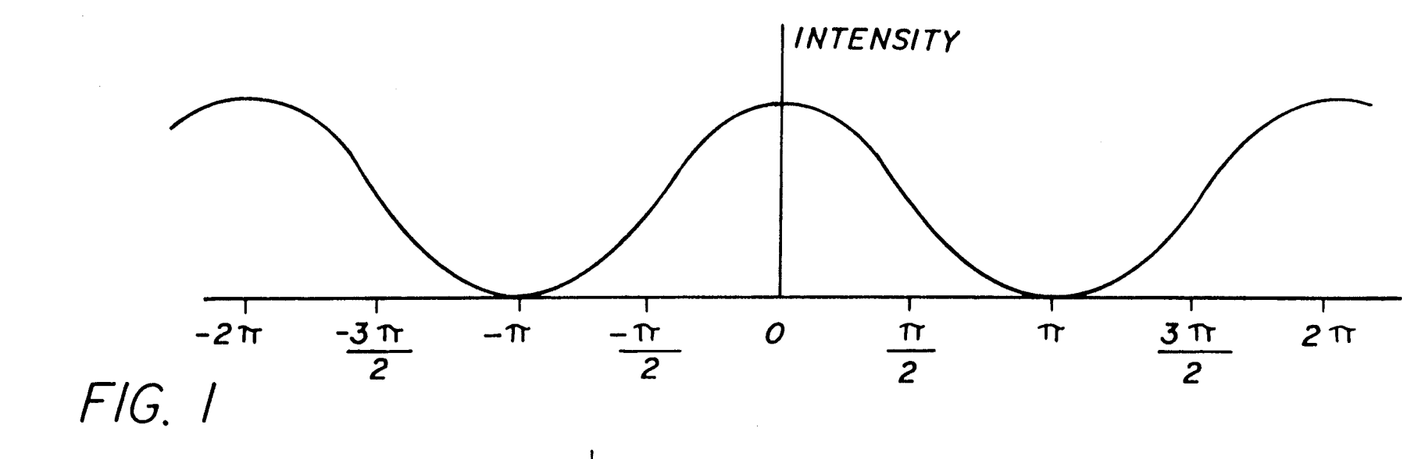
FIG. 1 is a graph of the relationship between the intensity of the combined (output) beam and the phase difference between counterpropagating (component) beams in a Sagnac interferometer.

FIG. 1 is a graph that illustrates the relationship between the intensity of the combined (output) beam and the phase difference between the counterpropagating composite beams. The fringe pattern as shown consists of two elements, a d.c. component and a component that is proportional to the cosine of the phase difference between the beams. Such phase difference provides a measure of the nonreciprocal perturbation due, for example, to rotation.

As a consequence of the shape of the fringe pattern, when small phase differences are to be measured (e.g. low rotation rates), the intensity of the combined beam is relatively insensitive to phase difference as the phase difference is then close to a maximum of the fringe pattern. Further, mere intensity of the composite beam does not indicate the sense or direction of rotation.

For the foregoing reasons, an artificially biased phase difference is commonly superimposed upon the counterpropagating beams. The biasing of the phase shift, also known as a "nonreciprocal null-shift", enhances the sensitivity of the intensity measurement to phase difference. A maximum degree of sensitivity is achieved by shifting the operating point of the gyroscope to $\pm\pi/2$. Furthermore, by alternating the bias between $+\pi/2$ and $-\pi/2$, two different operating points are observed. This enables the system to determine the sign of the phase difference and, thus, the direction of rotation.

In addition to phase modulation, the processing of the interferometer output commonly employs "phase-nulling" which introduces an additional phase shift through a negative feedback mechanism to compensate for that due to the non-reciprocal (Sagnac) effect. Commonly, the negative feedback generates a phase ramp whose slope is proportional to the rate of change of the measured phase difference. In actual practice, a ramp whose height varies between zero and $2\pi$ radians is employed as the nulling phase shift cannot be increased indefinitely due to voltage constraints.

In the past, phase nulling has employed both analog and digital techniques. In analog phase nulling, a sawtooth waveform whose slope is proportional to the phase difference and whose peak-to-peak amplitude is equal to $2\pi$ radians is combined with the above-described phase modulation (null shift) signal to drive the electro-optic phase modulator located within the gyroscope coil. The analog method is limited insofar as the scale factor of the phase modulation command differs from that utilized for the negative feedback. Furthermore, it is quite difficult to detect the $2\pi$ radians peak-to-peak amplitude in the analog method described supra.

Figure 2:
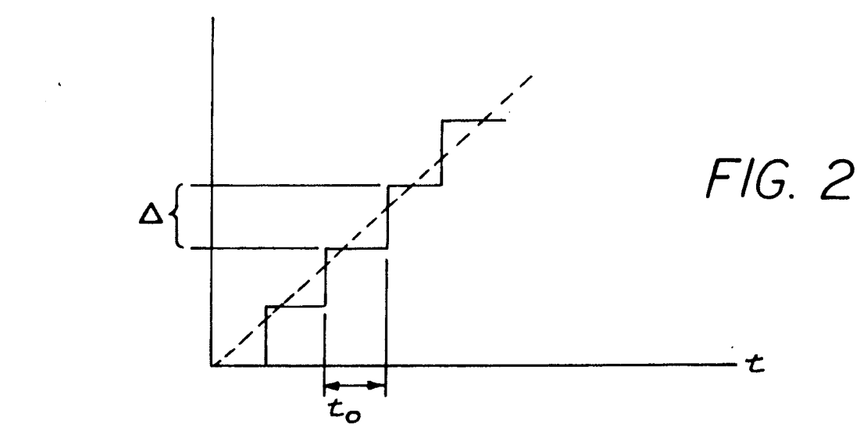
FIG. 2 is a graph of a portion of a phase ramp for measuring rotation rate in a Sagnac interferometer.

U.S. Pat. Ser. No. 4,705,399 of Graindorge, Arditty and Lefevre discloses a digitally-based arrangement that overcomes a number of the shortcomings of the analog sawtooth technique. In the patented system, a "stairstep" waveform replaces the sawtooth. The height of each step, $\Delta\phi_0$, is equal to the measured phase difference while the width or duration of each, $t_0$, is the group delay time of the optical coil. FIG. 2 is a graph of a portion of such a feedback ramp signal. On the average, the slope of the ramp is equivalent to the measured nonreciprocal phase difference per unit of time. Two waves whose respective delay is equal to the group delay of the gyro loop are always on two consecutive steps and their phases differ by $\Delta\phi_0$. This method is compatible with digital signal processing and enjoys many resulting advantages. Additionally, the phase modulation may be directly added to the digital ramp through the synchronization offered by a digital signal processor.

The (combined) signal ultimately controls the phase modulator that is positioned near one end of the optical fiber coil. This device may comprise an electro-optic crystal whose index of refraction is responsive to an applied voltage or a piezoelectric structure arranged to exert pressure upon the optical fiber in response to an applied voltage. The pressure, in turn, affects the length of the somewhat-compressed optical fiber.

Many applications, including navigation, require rotation and position information with respect to the three orthogonal space axes. Accordingly, a triad of interferometers may be required, one for sensing rotation about each of the rotation axes. In the past, systems of this type have employed three independent interferometers. That is, each interferometer has utilized a single dedicated source of optical energy and a single photodetector. As a result, a total of three sources of optical energy and three photodetectors have been required. The use of multiple sources of optical energy and photodetectors adds significantly to the weight, power consumption, heat dissipation and cost of an overall navigation system. Also, a control circuit is required for each source, further adding to size, heat and power consumption problems. One solution to the element multiplicity problem has been proposed in pending U.S. patent application Ser. No. 705,762 of Goldner covering "Triaxial Fiber Optic Sagnac Interferometer With Single Source and Detector." An arrangement that eliminates the need for either multiple sources or detectors is taught. However, the modulation technique utilized requires the alternating "blanking" of two of three gyros at all times which limits the sensitivity, and hence accuracy, of the triax.

Both single axis and multiple axis gyroscope configurations are subject to bias errors arising from crosstalk between the gyro output signal and elements of the system. For example, parasitic signals from the output digital-to-analog converter and from the driver amplifier of the gyro control loop can couple into the synchronous demodulator input. In addition, in a triaxial arrangement, such cross-coupling can take place between the digital-to-analog converters and driver amplifiers of one axis-measuring gyroscope and the synchronous demodulators of the gyros for measuring the other axes. Furthermore, in the event that a triaxial arrangement is simplified to operate with a single detector, the composite output may be subject to crosstalk between the outputs of the other axes.

Spahlinger has proposed a solution to the crosstalk problem in pending U.S. patent application Ser. No. 652,422 covering "Fiber Optic Sagnac Interferometer With Digital Phase Ramp Resetting." This method relies upon random or pseudo-random based demodulation sequences to obtain mean-zero bias errors. Unfortunately, random-based methods are inherently "global". Accordingly, a relatively-large system bandwidth is required to overcome sometimes-misleading "local" data.

SUMMARY OF THE INVENTION

The present invention addresses the preceding and other disadvantages of the prior art by providing, in a first aspect, an improvement in a method for measuring rotation rate with an interferometer in which a modulation sequence of optical phase shifts, each of which is an odd multiple of $\pi/2$ with a duration equal to the interferometer sensor coil transit time, is applied to a pair of counterpropagating light beams that are then combined and demodulated to determine rotation rate. Such improvement begins by generating a sequence of phase shifts, each of which is an odd multiple of $\pi/2$. A primary and a secondary demodulation sequence are generated that correspond to the sequence of phase shifts. The primary and secondary demodulation sequences are compared in accordance with a predetermined criterion and then the aforesaid sequence of steps is repeated until demodulation sequences are generated such that the criterion is satisfied. The sequence of phase shifts is selected that corresponds to the demodulation sequences that satisfy the criterion and then the sequence of phase shifts is applied to the pair of light beams whereby such pair is modulated in accordance with the selected sequence of phase shifts.

In another aspect, the invention provides an improvement in a Sagnac interferometer for measuring rotation rate about at least one axis of the type that includes means for applying a sequence of optical phase shifts, each of which is an odd multiple of $\pi/2$ and of duration equal to the sensor coil transit time, to a pair of light beams counterpropagating within at least one sensor coil and means for demodulating at least one beam pair to determine rotation rate about at least one axis. The improvement comprises apparatus for practicing a method substantially in accordance with that set forth in the preceding paragraph.

In yet another aspect, there is provided a triaxial fiber optic Sagnac interferometer for measuring rotation rates about a plurality of axes. Such an interferometer includes a source of optical energy. A plurality of gyroscopes are provided, each measuring rotation about an associated axis. Each of the gyroscopes comprises a coil of optical fiber. Means are provided for launching the optical energy into each of the coils as counter- propagating waves. Phase modulators located in each of the coils artificially modulate the phase difference between the counterpropagating waves. A single detector is provided for receiving the outputs of the gyroscopes. An optical network is provided for receiving the output of the source, distributing such output to the gyroscopes, receiving output of the gyroscopes and transmitting the outputs to the single detector. Finally, means are provided for driving each of the phase modulators with modulation waveforms selected in accordance with predetermined orthogonality criteria.

The preceding and other advantages and features of this invention will become further apparent from the detailed description that follows. Such description is accompanied by a set of drawing figures, numerals of the drawing figures, corresponding to those of the written description, point to the various features of the invention. Like numerals refer to like features throughout both the written description and the drawing figures.

DETAILED DESCRIPTION

The present invention pertains to the application of orthogonal modulation sequences to the selection of waveforms for modulating a fiber optic Sagnac interferometer. The inventors have developed decision rules in this regard for choosing modulation waveforms that are appropriate for both single axis and multiple gyro configurations. By employing the inventors' decision rules, one can operate single and/or multiple axis systems without the bias errors that arise from crosstalk in prior art systems thereby avoiding the weight, power consumption and cost problems associated with systems that employ multiple sources and detectors. Furthermore, systems employing the invention, as opposed to those that utilize random modulation are not subject to the vagaries of random sequences.

Two sequences $A_i$, $B_i$ are said to be orthogonal over "n" time periods if the sum of $A_iB_i$ over the n time intervals is identically zero. Such sequences are deterministic, thereby providing an advantage over random or pseudo-random methods. Unlike a random or pseudo-random method, pairs of sequences designed to be orthogonal will reliably have a mean zero value within a predictable number of time intervals. In contrast, sequences possessing a random character can include correlated sub-sequences of unpredictable lengths. This feature of orthogonal sequences permits the user to analyze data representative of a finite number of modulated transits of an optical coil with confidence.

Figures 3, 4:
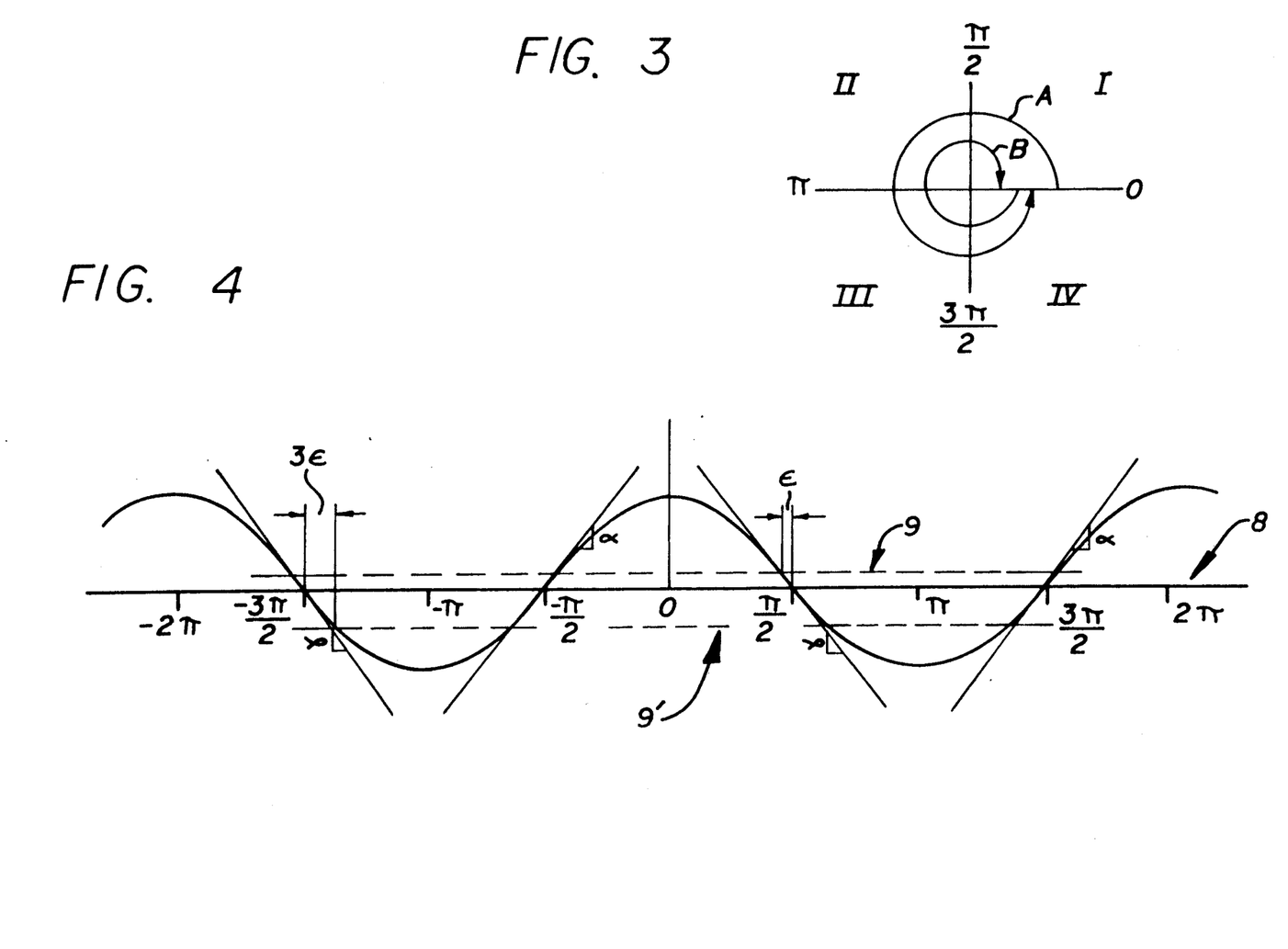
FIG. 3 is a graph for generating modulating waveforms corresponding to digital demodulation sequences and vice versa.
FIG. 4 is a diagram of the relationship between output intensity fringes and phase difference that includes a number of references for indicating characteristics pertinent to the selection of modulation sequences in accordance with the invention.

Not all waveforms are useful for application to the phase modulation problem and the inventors have derived a series of selection rules based, in part, upon orthogonal demodulation sequences, for choosing appropriate waveforms that impose artificial phase differences upon the conterpropagating beams. FIG. 3 is a graph for generating modulating waveforms corresponding to digital demodulation sequences (and vice versa) for analyzing orthogonality properties. (It should also be recognized that the selection of proper modulation waveforms also involves some rules, discussed with reference to FIG. 4, that are unrelated to the demodulation sequences.) As can be seen, the graph of FIG. 3 comprises four quadrants denoted "I","II","III" and "IV". Associated with each of such quadrants is a phase shift that is indicated in parentheses. Individual elements of a demodulation sequence can assume only the values of $+1$ or $-1$ and are related to the modulation waveform thusly; a counterclockwise transition of the graph (representing a transition in the value of the modulation waveform) corresponds to a "$+1$" of the primary demodulation sequence and a clockwise transition corresponds to a "$-1$". Thus, assuming that one begins in quadrant I, a transition in the modulation waveform from 0 radians to $\pi/2$ radians implies a $+1$ value of the primary demodulation sequence (of course, when the transition in modulation from one loop transit to the another decreases by $\pi/2$, the corresponding element of the primary demodulation sequence is $-1$.) Thus, the following sequence of artificial phase differences (ie. the modulation sequences) between counterpropagating beam pairs: ($+\pi/2$, $+\pi/2$, $+\pi/2$, $-3\pi/2$, $+3\pi/2$, $-\pi/2$, $-\pi/2$, $-\pi/2$) corresponds to the following primary demodulation sequence: ($+1$, $+1$, $+1$, $+1$, $-1$, $-1$, $-1$, $-1$). This relationship may be seen more clearly on the diagram of FIG. 3 where the counterclockwise arc A indicates the first four successive phase shifts and the clockwise arc B indicates the remaining four phase shifts.

In addition to illustrating the relationship between a modulation sequence and the primary demodulation sequence, the secondary demodulation sequence may also be determined from the modulation waveform by means of the graph of FIG. 3. The secondary or scale factor demodulation sequence is determined by assigning the value $+1$ to each instance in which the positive real axis is crossed and $-1$ to every other instance. Referring again to the transitions associated with the hypothetical modulation waveform, a secondary demodulation sequence is derived as follows ($-1$, $-1$, $-1$, $+1$, $+1$, $-1$, $-1$, $-1$). As will be discussed below, one of the decision rules for selecting a modulation sequence for a Sagnac interferometer is that the associated primary and secondary demodulation sequences are orthogonal. Multiplying the two demodulation sequences obtained from the above modulation sequence on an element-by-element fashion yields $-1$, $-1$, $-1$, $+1$, $-1$, $+1$, $+1$, $+1$, the sum of which is 0. Thus, in this case, the modulation waveform is shown to "produce" orthogonal primary and secondary demodulation sequences.

In the present invention, modulation sequences are examined to determine those that possess favorable qualities. In practice, numerous sequences of phase shifts may be input to a computer. As mentioned earlier, some selection rules are unrelated to the resulting digital demodulation sequences while others look only to such sequences. The examination of modulation sequences can occur with respect to both types of criteria in any order.

Referring first to demodulation, each modulation sequence candidate is "decoded" in accordance with the protocol discussed with reference to FIG. 3 to determine the implicit primary and secondary demodulation sequences, each comprising a series of $+1$ and $-1$ elements. Then, the primary and secondary demodulation sequence pairs are "multiplied" on an element-by-element basis to determine orthogonality within the selected number of time intervals. The modulation sequences that do not yield orthogonal primary and secondary demodulation pairs are disregarded and the corresponding "successful" modulation sequence candidates are identified. The surviving modulation sequences are then analyzed as discussed below to further eliminate unsuitable waveforms. The rules and the rationales behind the rules that are employed to select those modulation sequences (each, of course, characterized by implicit orthogonal primary and secondary demodulation sequences) are discussed below.

FIG. 4 is a diagram of the relationship between the intensity fringes of the output of an interferometer coil and the phase difference between the light beams counterpropagating within the loop. This diagram with x-axis 8 shifted as shown, is identical to that of FIG. 1 in substance; however, a number of markings are added in FIG. 4 for illustrating the analysis of the modulation sequence selection rules that follow.

Referring back to FIG. 1 and the discussion accompanying that figure, the first decision rule mandates that the modulation waveform must comprise a series of steps that are odd multiples of $\pi/2$; that is, $\pm\pi/2$, $\pm 3\pi/2$. As is explained with reference to FIG. 1, the sensitivity of the fringe pattern is at a maximum at such points. As a second rule of selection, the total number $+\pi/2$ and $-3\pi/2$ modulation steps of the waveform must equal the total number of $-\pi/2$ and $+3\pi/2$ modulation steps. The rationale behind this rule is evident from FIG. 4. As indicated, the slope o of the tangent to the fringe pattern at $+\pi/2$ is the same as that at $-3\pi/2$ while the tangents at $-\pi/2$ and $+3\pi/2$ are also of equal slope $-\alpha$. Since the derivative or slope of the curve provides rate error information, the primary or rate demodulation examines the tangent or slope of the curve. An inequality between the number of points at a positive (or negative) and negative (or positive) slope demodulated will introduce a sensitivity to offsets in the intensity signal and could cause a false rate indication.

A final qualitative rule for selection of a modulation voltage waveform is that the number of $\pm 3\pi/2$ modulation steps should be only one third of the number of $\pm \pi/2$ modulation steps. Referring back to the waveform of FIG. 2, one can appreciate the fact that the scale factor error increases in proportion to the degree of modulation prior to resetting at $2\pi$. This is also indicated by the relative d.c. level shifts, 9 and 9' due to scale factor errors $\epsilon$ and $\epsilon$, respectively shown on FIG. 4. In the event that this condition or rule were not satisfied, an apparent average intensity level shift would be incurred as a function of scale factor error. Furthermore, the presence of an offset in the detector or preamplifier would perturb the measurement of scale factor error.

As mentioned, in addition to the above-referenced criteria for examination of modulation waveforms, a number of criteria or rules relate to the implicit digital demodulation sequences. Such rules, applying to both single axis and multiple gyro systems are set forth below:

1. The primary demodulation must be orthogonal to the secondary demodulation sequence. This rule, already mentioned, is required to assure that the rate error and scale factor error values will not corrupt each other. That is, the presence of scale factor error should not indicate rate and vice versa.

2. The digital representation of the modulation voltage and individual modulation bits, their integrals and differentials, should be orthogonal to both the primary and secondary demodulation sequences.

3. The digital representation of modulation voltage changes and individual modulation bit changes, their integrals and differentials, should be orthogonal to both the primary and secondary demodulation sequences.

4. For a single detector configuration (discussed below), the primary demodulation of any gyro must be orthogonal to both the primary demodulation of any other gyro and to the secondary demodulation of any other gyro. Likewise, the secondary demodulation of any gyro must be orthogonal to the primary demodulation and the secondary demodulation of any other gyro. This represents an extension of the procedure discussed with reference to the selection of modulation sequences based upon the numerous requirements already discussed with reference to a single gyro system.

5. For a single detector configuration, the digital representation of modulation voltage and individual modulation bits of any gyro and their integrals and differentials should be orthogonal to the primary and secondary demodulation of any other gyro and the digital representation of modulation voltage changes and individual bit changes of any gyro should be orthogonal to the primary demodulation and the secondary demodulation of any other gyro.

6. It is desirable that the sequence length should be of minimum length (preferably on the order of thirty-two gyro transit cycles or less) to insure sufficient loop controller bandwidth as such bandwidth is inversely proportional to sequence length.

Of the above-referenced rules, number 1 is absolutely required for a single axis system while number 4 is absolutely required for a multi-axis system using a single detector. Furthermore, rule number 1 must be satisfied for multiple axis systems employing multiple detectors. The other rules, while setting forth desirable conditions (such as eliminating bias due to crosstalk), are not absolutely required.

Figure 5:
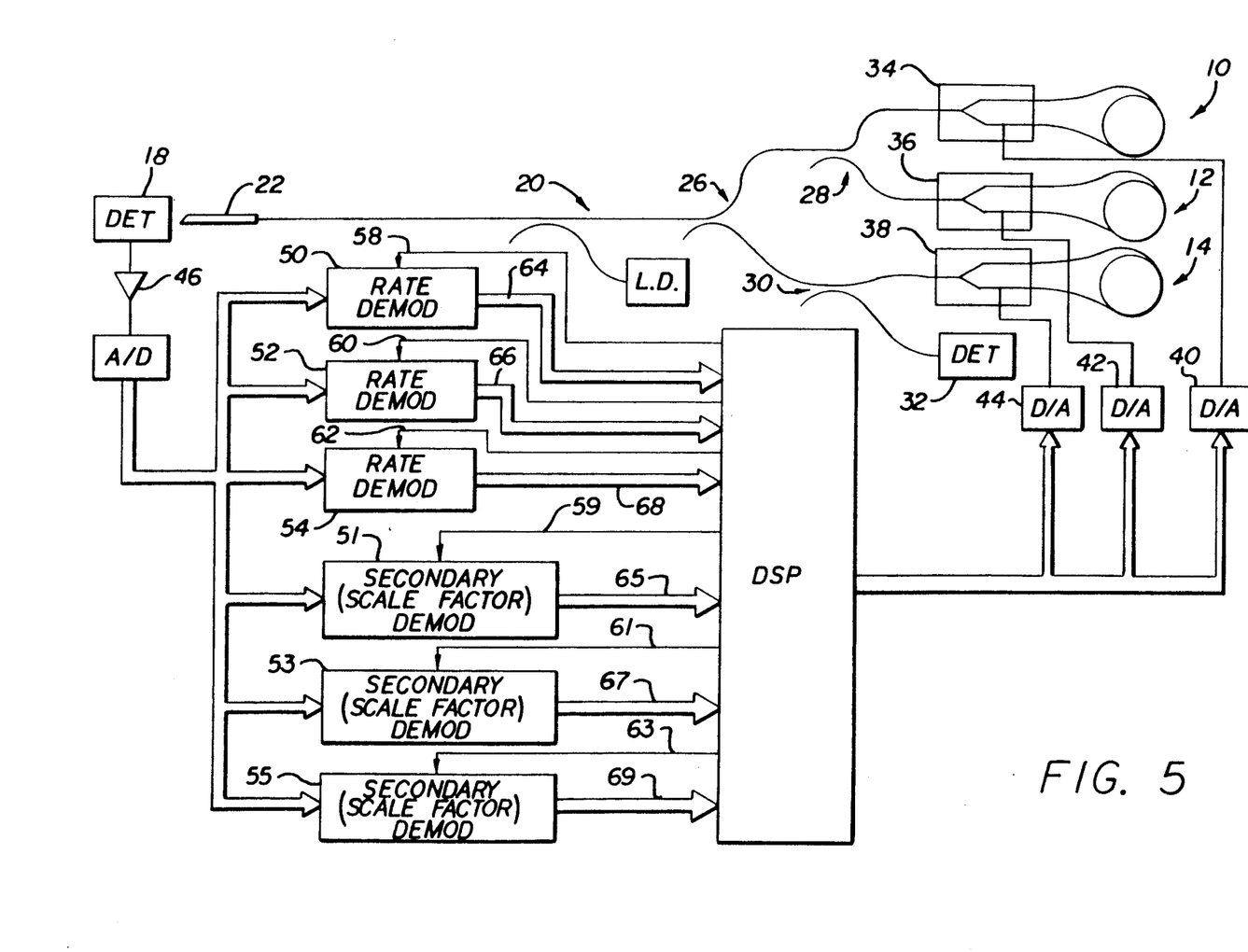
FIG. 5 is a block diagram of a triaxial fiber optic Sagnac interferometer configured to utilize modulation based upon orthogonal demodulation sequences.

FIG. 5 is a block diagram of a triaxial fiber optic Sagnac interferometer that is configured to utilize modulation based, at least in part, upon orthogonal demodulation sequences. Thus, the arrangement of FIG. 5 is suitable for processing the outputs of optical coils 10, 12 and 14 in a system that utilizes a single source 16 and a single detector 18. Such a system advantageously employs a substantially reduced amount of hardware in comparison to prior art arrangements that require, for example, multiple sources and detectors to avoid crosstalk between channels that is addressed by the selection of modulation sequences as described above. For example, as this description of this system proceeds it will be appreciated that, without any reduction in the signal-to-noise ratio, and without any need to employ shielding, the arrangement of FIG. 5 results in a savings of three (3) multiplexer couplers, two (2) detectors, two (2) preamplifiers and two (2) analog-to-digital converters over the prior art triaxial interferometer that is commercially available under the designation LN-200. Furthermore, by employing modulation based upon deterministic sequences and selection rules designed to eliminate bias from the demodulation process, the arrangement of FIG. 5 is subject neither to the inherent uncertainties of random-based processes (as in the Spahlinger patent application) nor to the loss of information through signal blanking (as in the Goldner patent application). It will be readily appreciated by those skilled in the art that the circuitry of FIG. 5 and the associated orthogonal modulation scheme may be readily modified in accordance with the invention to provide corresponding advantages in other multiple gyro systems (e.g. two or four axes.)

Turning to FIG. 5, the laser diode source 16 provides energy via the wavelength division multiplexing fiber coupler 20 for pumping a rare earth-doped fiber 22 that is configured to act as both a source and an optical preamplifier. The details and operation of such an arrangement are described in pending U.S. patent application 07/666,264 of Robert F. Kalman, Paul F. Wysocki and Michel J. F. Digonnet filed Mar. 7, 1991 and entitled "Large Signal Three-Level Superfluorescent Fiber Sources." The aforesaid patent application is the property of the assignee herein and its teachings are hereby incorporated by reference.

The light emitted by the broadband fiber source 22 is applied to a splitter-combiner network 24 comprising a primary (50/50) coupler 26 and a pair of secondary (50/50) couplers 28 and 30 arranged as shown. The splitter-combiner network 24 acts to divide the incident light equally into four waves. Three of those four waves are delivered to the three optical coils 10, 12 and 14 for measuring rotation rates about three orthogonal axes. The fourth portion of the light energy is delivered to a monitor detector 32 that forms a portion of a circuit for stabilizing the output of the broadband fiber source preamplifier 22. Such a circuit is considered neither novel nor an essential feature of the present invention and thus is not illustrated in detail in FIG. 5.

Multifunction integrated optical chips 34, 36 and 38 are associated with the optical coils 10, 12 and 14 respectively. Each of such chips, comprising a substrate of electro-optically active material such as LiNbO$_3$ or LiTaO$_3$, with a y-junction waveguide deposited or diffused thereon and further including a polarizer, functions as both an interface between the splitter/combiner network 24 and the fiber optic coils 10, 12 and 14 serving to separate (and later combine) the incoming optical energy into two beams for counterpropagating within the coils and a phase modulator, applying predetermined, artificial phase differences between the counterpropagating beam pairs. In the latter regard, it should be understood that each of the chips 34, 36 and 38 incorporates a phase modulation function for affecting the modulation patterns determined in accordance with the preceding discussion of modulation selection rules and the like. This function is responsive to analog waveforms. Such waveforms are received from digital-to-analog converters, discussed below.

As FIG. 5 represents a multiple gyro system, each of the optical coils or gyros 10, 12 and 14 is modulated by a separate waveform that is selected, in part, in relation to (but independent of) the waveforms applied to the other two gyros. Digital-to-analog converters 40, 42 and 44 provide analog electrical signals to the chips 34, 36 and 36 respectively for inducing the desired optical phase shifts.

The phase-modulated optical signal outputs of the gyros 10, 12 and 14 return through the splitter/combiner network 24 and are successively combined at the couplers 28 and 26. The combined signal is then transmitted through the wavelength division multiplexing fiber coupler 20 to the broadband fiber source 22 that now acts upon the incoming optical signal as an optical preamplifier. This combined signal is then applied to the common photo- detector 18 wherein it is converted to a corresponding electrical current or voltage proportional to the optical intensity. The resulting electrical signal is applied to a preamplifier 46 and then applied to an analog-to-digital converter 48 to produce an amplified and digitized signal which is simultaneously transmitted to three digital rate demodulators 50, 52 and 54.

A digital signal processor 56 communicates with each of the rate demodulators 50, 52 and 54 and provides outputs for directing digital-to-analog converters 40, 42 and 44 to impose modulating waveforms to the modulators associated with the gyro coils 10, 12 and 14. Each of the rate demodulators 50, 52 and 54, while accepting the identical combined output signal, receives a unique primary or rate demodulation sequence from the signal processor 56 through the data paths 58, 60 and 62 respectively. In turn, the signal processor 56 receives the demodulated rate for each of the axes through the buses 64, 66 and 68. The output of each rate demodulator is the rate error signal for one of the orthogonal axes. The demodulated rate signal is then processed by the signal processor 56 (or by parallel individual signal processors) to generate a ramp feedback signal. The ramp signal is added to the modulation sequence for that particular gyro to drive the rate error signal from the demodulator for that gyro to zero.

The digital signals provided by converter 48 are also provided to secondary demodulators 51, 53 and 55 associated with measurement of the phase modulator scale factor errors. Each of the demodulators 51, 53 and 55 also receives a unique secondary or scale factor demodulation sequence from the signal processor 56 through the data paths 59, 61, and 63 respectively. In turn, the signal processor 56 receives the demodulated scale factor data for each of the axes through the buses 65, 67 and 69. The output of each scale factor demodulator is the scale factor error signal for one of the orthogonal axes. The demodulated scale factor signal is then processed by the signal processor 56 (or by parallel individual signal processors) to generate a compensation for any residual scale factor error. Such compensation may be accomplished in one of many different ways. For example, the digital ramp signals generated using the outputs of the rate demodulators 50, 52, and 54 as well as the modulation and reset values can be multiplied by scale factors which compensate for the phase modulator sensitivity errors or variations. Alternatively, the reference voltages of the D/A converters 40, 42, and 44 can be adjusted so that the digital inputs to D/A converters 40, 42 and 44 generate analog voltages commensurate with the phase modulator sensitivities. While FIG. 5 shows rate and scale factor demodulators as separate blocks, it is possible to incorporate these functions directly within the signal processor 56 provided that this device has sufficient throughput.

Figure 6:
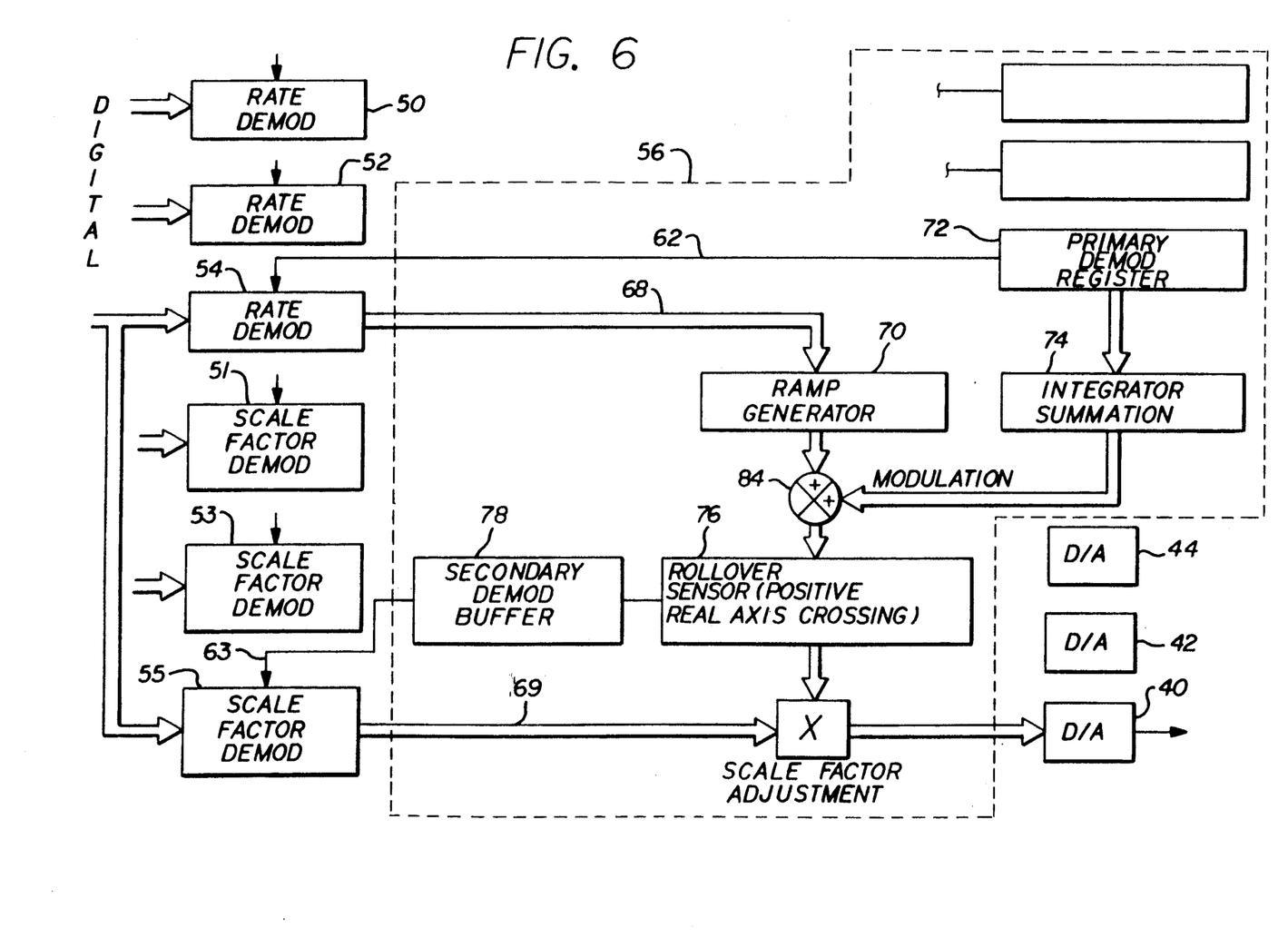
FIG. 6 is a functional block diagram for illustrating the implementation of the modulation processes of the invention.

FIG. 6 is a block diagram representation of the organization of the signal processor 56 for performing the functions described with reference to FIG. 5. That is, the signal processor 56 provides a unique reference signal to each of the three rate demodulators 50, 52 and 54 and, in turn, accepts the output rate errors signals of those demodulators. The rate error signals are then manipulated in accordance with the invention to derive feedback and modulation signals for driving the modulators 34, 36 and 38 during the next loop transit time.

The illustration and description with reference to FIG. 6 is somewhat simplified insofar as details of the operation of the signal processor are illustrated solely with respect to a single axis. However, from the preceding discussion it will be appreciated that the following discussion is applicable to the other axes and that like processing is involved. The only substantive difference between the processing of signals relating to the three axes derives from distinctions between the modulation (and, hence, demodulation) sequences "assigned" to each axis. As is apparent from the preceding discussion, the process for selecting demodulation sequences takes all axes into consideration in the case of a multi-axis system in applying the relevant selection rules. That is, demodulation sequences (and, therefore, the corresponding modulation sequences) are chosen as a group for a triaxial system utilizing a single detector 18 as shown in FIG. 5.

Referring to FIG. 6, the various signal processor functions are indicated within the outlined section 56. Focusing upon the gyro axis that is modulated by the output of the digital-to-analog converter 40, and whose output is demodulated at the rate demodulator 54, one can observe that the unique primary demodulation sequence for such axis is stored in a primary demodulation register 72 (one of three registers). As mentioned with respect to FIG. 5, the sequence stored in the primary demodulation register 72 is applied to the rate demodulator 54 to extract the rate error signal for the corresponding axis from the composite output signal received at the detector 18.

The rate error signal is applied to a ramp generator 70, producing a digital sequence that corresponds to the stepwise ramp of FIG. 2.

The modulation sequence for obtaining good gyro rate sensitivity is derived from the primary demodulation sequence in the manner taught by the discussion associated with FIG. 3. In order to implement such process, a digital integrator 74 first receives the digital primary demodulation sequence from the primary demodulation register 72. The integrator 74 effectively "tracks" transitions dictated by the primary sequence about a coordinate system as shown in FIG. 3. As mentioned earlier, the transitions represented by the primary demodulation sequence relate the phase shift transitions to the digital demodulation sequence. The modulation is added to the digital ramp created by generator 70 to provide a driving signal for the gyro phase modulator. However, in order to accommodate the limited drive voltage range available, it is necessary to rollover or reset the signal so that it covers a range of $2n\pi$.

A rollover sensor 76 which can be a digital comparator or which can directly result from proper scaling of the binary format digital data, is used to detect positive real axis transitions as described in FIG. 3. When a positive real axis transition is sensed, the secondary demodulation sequence of the axis under investigation is correspondingly saved as discussed above to produce the secondary demodulation sequence for that axis. A buffer 78 accepts the secondary demodulation sequence. The secondary demodulation is then applied to the secondary demodulator 55 which operates on the digital representation of the FOG output signal provided by A/D converter 48. The secondary demodulator 55 determines the scale factor error and compensates for it by means of the multiplier 80 which scales the digital output to the proper value to match the actual phase modulator scale factor (or sensitivity).

The output of the multiplier 80 comprises a digital representation of the combined modulation and ramp signals properly scaled to the gyro phase modulator sensitivity. The output of the multiplier 80 is then applied to the digital-to-analog converter 40 of the selected axis to drive the electro-optic modulator 34.

By employing the teachings of this invention with respect to the selection of orthogonal demodulation sequences, one is assured that the unfavorable effects often associated with the combination of signal processing required by the architecture of the triaxial gyro of FIG. 5 are overcome. By enabling one to employ a triaxial system of the type described, one can realize significant economies in terms of component savings and performance enhancement. Furthermore, by employing the teachings of this invention with regard to orthogonal sequences one is assured that the deleterious effects of undesired cross-coupling within individual gyros are also minimized. This benefit can be achieved for either gyros with individual detectors or for multiple gyros with a common detector.

While this invention has been described with reference to its presently preferred embodiment, it is not limited thereto. Rather, this invention is limited only insofar as defined by the following set of patent claims and includes within its scope all equivalents thereof.

What is claimed is:

1. In a method for measuring rotation rate with an interferometer in which a modulation sequence of optical phase shifts, each being an odd multiple of $\pi/2$ and having a duration equal to the interferometer sensor coil transit time, is applied to a pair of counterpropagating light beams that are then combined and demodulated to determine rotation rate, the improvement comprising the steps of:
   a) generating a sequence of phase shifts, each of said phase shifts being an odd multiple of $\pi/2$;
   b) generating a primary and secondary demodulation sequence that correspond to said phase shift sequence; then
   c) comparing said primary and secondary demodulation sequences in accordance with a predetermined criterion; then
   d) repeating steps (a) through (c) until demodulation sequences are generated such that said criterion is satisfied; then
   e) selecting said sequence of phase shifts that corresponds to the demodulation sequences that satisfy said criterion; and then
   f) applying said sequence of phase shifts to said pair of light beams whereby said pair is modulated in accordance with said selected sequence.

2. A method for measuring rotation rate as defined in claim 1 wherein the step of generating a primary and a secondary demodulation sequence corresponding to a chosen sequence further includes the steps of:
   a) assigning the phase shift values 0, $\pi/2$, $\pi$ and $3\pi/2$ respectively to four adjacent quadrants of an x-y coordinate system; then
   b) relating said phase shifts to said coordinate system; and then
   c) deriving a primary demodulation sequence and a secondary demodulation sequence by assigning $+1$ or $-1$ to predetermined transitions of said coordinate system, each of said transitions corresponding to a transition in phase shift values of said chosen sequence.

3. A method as defined in claim 2 further characterized in that the step of deriving said primary sequence further includes the steps of:
   a) assigning $+1$ to each counterclockwise transition of said coordinate system; and
   b) assigning $-1$ to each clockwise transition of said coordinate system.

4. A method as defined in claim 3 further characterized in that the step of deriving said secondary sequence further includes the steps of:
   a) assigning a $+1$ value every time a transition crosses the positive real axis of said coordinate system in a counterclockwise direction; and
   b) assigning a $-1$ value every time a transition crosses the real axis in the clockwise direction.

5. A method as defined in claim 4 wherein the step of choosing a sequence of phase shifts further includes the step of choosing a sequence in which the number of $\pm 3\pi/2$ phase shifts is one third the number of $\pm \pi/2$ phase shifts.

6. A method as defined in claim 5 wherein the step of comparing said demodulation sequences includes the steps of:
   a) multiplying said sequences together on an element-by-element basis; and then
   b) summing said multiplication products.

7. A method as defined in claim 6 wherein the step of selecting further includes the step of selecting a sequence in which the sum of said multiplication products is equal to zero.

8. A method as defined in claim 7 further including the steps of:

a) multiplying each of said phase shifts by said primary demodulation sequence on an element-by-element basis; then
b) summing said multiplication products; and then
c) selecting a sequence in which the sum of said multiplication products is zero.

9. A method as defined in claim 8 further including the steps of:
a) multiplying each of said phase shifts by said secondary demodulation sequence on an element-by-element basis; then
b) summing said multiplication products; and then
c) selecting a sequence in which the sum of said multiplication products is zero.

10. A method as defined in claim 7 further including the steps of:
a) calculating the values of the transitions between consecutive phase shifts of said sequence; then
b) multiplying each of said transitions by said primary demodulation sequence on an element-by-element basis; then
c) summing said multiplication products; and then
d) selecting a sequence in a which the sum of said multiplication products is zero.

11. A method as defined in claim 10 further including the steps of:
a) calculating the values of the transitions between consecutive phase shifts of said sequence; then
b) multiplying each of said transitions by said secondary demodulation sequence on an element-by-element basis; then
c) summing said multiplication products; and then
d) selecting a sequence in which the sum of said multiplication products is zero.

12. In a Sagnac interferometer for measuring rotation rate about at least one axis of the type that includes means for applying a sequence of optical phase shifts, each of said phase shifts being an odd multiple of $\pi/2$ and of duration equal to the sensor coil transit time, to a pair of light beams counterpropagating within at least one sensor coil and means for combining and for demodulating said at least one beam pair to determine rotation rate about at least one axis, the improvement comprising, in combination:
a) means for generating a sequence of phase shifts, each of said phase shifts being an odd multiple of $\pi/2$;
b) means for generating a primary and secondary demodulation sequence that correspond to said phase shift sequence; then
c) means for comparing said primary and secondary demodulation sequences in accordance with a predetermined criterion; then
d) means for selecting a sequence of phase shifts that corresponds to the demodulation sequences that satisfy said criterion; and
e) means for applying said sequence of phase shifts to said pair of light beams whereby said pair is modulated in accordance with said selected sequence.

13. A Sagnac interferometer as defined in claim 12 wherein said means for generating a primary and a secondary demodulation sequence corresponding to a phase shift sequence further includes:
a) means for assigning the phase shift values 0, $\pi/2$, $\pi$ and $3\pi/2$ respectively to four adjacent quadrants of an x-y coordinate system;
b) means for relating said phase shifts to said coordinate system; and
c) means for deriving a primary demodulation sequence and a secondary demodulation sequence by assigning $+1$ or $-1$ to predetermined transitions of said coordinate system, each of said transitions corresponding to a transition in phase shift values of said chosen sequence.

14. A Sagnac interferometer as defined in claim 13 wherein said means for deriving said primary sequence further includes:
a) means for assigning $+1$ to each clockwise transition of said coordinate system; and
b) means for assigning $-1$ to each clockwise transition of said coordinate system.

15. A Sagnac interferometer as defined in claim 14 further characterized in that said means for deriving said secondary sequence further includes:
a) means for assigning a $+1$ value every time a transition crosses the positive real axis of said coordinate system; and
b) means for assigning a $-1$ value for every other transition.

16. A Sagnac interferometer as defined in claim 15 wherein said means for choosing a sequence of phase shifts further includes means for choosing a sequence in which the number of $\pm 3\pi/2$ phase shifts is one third the number of $\pm \pi/2$ phase shifts.

17. A Sagnac interferometer as defined in claim 16 wherein said means for comparing said demodulation sequences further includes:
a) means for multiplying said sequences together on an element-by-element basis; and
b) means for summing said multiplication products.

18. A Sagnac interferometer as defined in claim 17 wherein said means for selecting further includes means for selecting a sequence in which the sum of said multiplication products is equal to zero.

19. A Sagnac interferometer as defined in claim 18 further including:
a) means for multiplying each of said phase shifts by said primary demodulation sequence on an element-by-element basis;
b) means for summing said multiplication products; and
c) means for selecting a sequence in which the sum of said multiplication products is zero.

20. A Sagnac interferometer as defined in claim 19 further including:
a) means for multiplying each of said phase shifts by said secondary demodulation sequence on an element-by-element basis;
b) means for summing said multiplication products; and
c) means for selecting a sequence in which the sum of said multiplication products is zero.

21. A Sagnac interferometer as defined in claim 20 further including:
a) means for calculating the values of the transitions between consecutive phase shifts of said sequence;
b) means for multiplying each of said transitions by said primary demodulation sequence on an element-by-element basis;
c) means for summing said multiplication products; and
d) means for selecting a sequence in which the sum of said multiplication products is zero.

22. A Sagnac interferometer as defined in claim 21 further including:

a) means for calculating the values of the transitions between consecutive phase shifts of said sequence;
b) means for multiplying each of said transitions by said secondary demodulation sequence on an element-by-element basis;
c) means for summing said multiplication products; and
d) means for selecting a sequence in which the sum of said multiplication products is zero.

23. A Sagnac interferometer as defined in claim 22 further characterized in that said interferometer includes three sensor coils arranged to measure rotation rates about three nominally mutually-orthogonal axes.

24. In a fiber optic Sagnac interferometer of the type that includes a plurality of gyroscopes, each comprising a coil of optical fiber, means for launching optical energy into each of said coils as counterpropagating beams and a phase modulator associated with each of said coils for artificially modulating the phase difference between each pair of counterpropagating beams, the improvement comprising in combination:

a) a common source of optical energy;
b) a common detector for receiving the superimposed outputs of each of said gyroscopes;
c) an optical network for receiving the output of said source, distributing said output from said gyroscopes and transmitting said outputs to said common detector; and
d) means for driving said phase modulators with modulation waveforms selected in accordance with predetermined orthogonality criteria.

* * * * *